Figure 1:
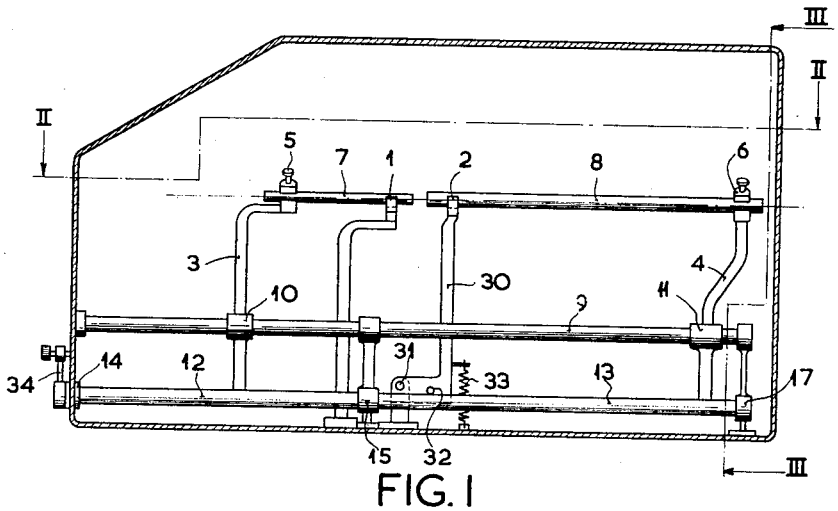

July 24, 1962

B. J. KUPPENS 3,046,437

ADJUSTABLE ARRANGEMENT FOR POSITIONING
CARBON RODS FOR STRIKING AN ARC

Filed July 28, 1959

INVENTOR
bernardus johannes kuppens

BY

AGENT

United States Patent Office 3,046,437
Patented July 24, 1962

3,046,437
ADJUSTABLE ARRANGEMENT FOR POSITIONING CARBON RODS FOR STRIKING AN ARC
Bernardus Johannes Kuppens, Eindhoven, Netherlands, assignor to North American Philips Company, Inc., New York, N.Y., a corporation of Delaware
Filed July 28, 1959, Ser. No. 830,961
Claims priority, application Netherlands Sept. 23, 1958
4 Claims. (Cl. 314—51)

This invention relates to a device for striking a carbon arc, for example, for cinematograph film projectors, in which provision is made of supports for the facing ends of the carbons which can slide thereon in their direction of length, while for the opposed ends of the carbons there are carriages provided with clamping devices which are movable in the direction of the carbon axes over a guide member.

In a device of the above-mentioned kind, it is desirable for the intensity of the arc to be adjustable by the use of carbons of different diameters, while it must be possible to bring the axes of these carbons of different diameters into substantially the same position. This arrangement enables the optical image of the arc to be correctly located in a simple manner without the optical means, for example a mirror, having to be adjusted. A mirror adjustment for the above-mentioned purpose usually involves losses of light.

For the above-mentioned purpose, the supports and the clamping devices might be adjusted separately. However, this would take much time.

According to the present invention, the support and the clamping means of at least one carbon are jointly adjustable so that the axes of carbons of different diameters can be brought into substantially the same position.

In practice, it is frequently sufficient for one of the carbons to be accurately adjusted, since the location of the optical image of the arc is substantially determined thereby. The support of the other carbon must be adjusted separately in any case, since its position determines the maintenance of the arc. Preferably, however, according to a further feature of the invention, the clamping means of the other carbon also is adjustable jointly with the support and the clamping means of the first-mentioned carbon.

The invention can be simply carried out in that the adjustment is controlled by a profiled control member which is mounted for rotation and substantially extends in the direction of length of the carbons.

In view of the fact that the carriages are movable over a guide member, which movement is necessary to keep the arc length constant, the simplest arrangement for the adjustment according to the invention would be for the carriages to be rotated about the guiding means. However, for this purpose, the carbons must be clamped so that the clamping of rods of different diameters causes the axes of the rods to be shifted so that their movement substantially coincides with the movement of the rod as a result of adjustment. In order to fulfill the above-mentioned condition, according to a further feature of the invention, the carriages and the clamping devices are rotatable about their guiding members for the adjustment, the fixed abutment stop or stops of the clamping devices being chosen so that the perpendicular bisector of the line joining the centers of the cross-sections of two carbons of different diameters at right angles to their axes passes substantially through the pivotal point of the carriage.

Since the support need not be movable in order to keep the arc length constant, the movement for adjustment can be chosen independently of the guiding. With respect to this movement, allowance must be made for the fact that the carbon must be freely slidable over a support and consequently is held on the support preferably by gravity only. Hence, according to a further feature of the invention, the support is rotatable about a horizontal shaft which extends at right angles to the direction of length of the control member.

Figure 2:
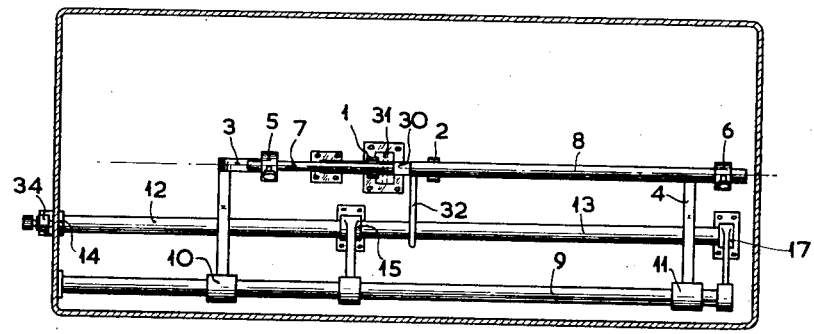
Figure 3:
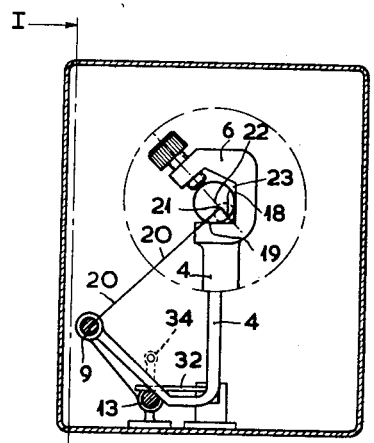

In order that the invention may be readily carried out, an embodiment thereof will now be described, by way of example, with reference to the accompanying diagrammatic drawings, in which FIG. 1 is a vertical sectional view of a lamphouse for a film projector in accordance with the invention, FIG. 2 is a horizontal sectional view on the line II—II of FIG. 1, and FIG. 3 is a vertical sectional view on the line III—III of FIG. 1.

In the figures, reference numerals 1 and 2 denote supports for the facing ends of carbons 7 and 8. These supports are blocks each provided with a V-shaped groove in which the carbons can be arranged so as to be freely slidable over the supports 1 and 2 in the direction of their length. Carriages 3 and 4 are each provided with a clamping device 5 and 6 respectively for the opposed ends of the carbons 7 and 8. The carriages 3 and 4 are movable in the direction of the carbons and in this movement are guided by a tube 9 on which sleeves 10 and 11 and the carriages 3 and 4 are so mounted as to be slidable and also rotatable. A control member comprising two tubes 12 and 13 is rotatable in the direction of length of the lamp about eccentrically journalled shafts. The carriages 3 and 4 bear against the tubes 12 and 13, respectively, by the force of gravity. Since the tubes 12 and 13 have a certain eccentricity relative to their bearings 14, 15 and 17, rotation of these tubes results in an adjusting movement of the carriages 3 and 4 which results in a rotation of the clamping devices 5 and 6 about the tube 9. FIG. 3 shows clearly how the carriages 3 and 4 can be rotated about the tube 9 by turning the tubes 12 and 13. Hence, the fixed abutments 18 and 19 of the clamping device 6 for one carbon are chosen so that a perpendicular bisector 20 of the line 21 joining the centers 22 and 23 of two carbons of different diameters substantially passes through the axis of the tube 9. The support 2 is arranged on a frame 30 which is rotatable about a shaft 31. The frame 30 is provided with a stud 32 which bears on the tube 13. The contact between the stud 32 and the tube 13 is ensured not only by the force of gravity, but also by a spring 33. The shaft 31 extends horizontally and at right angles to the direction of length of the tubes 12 and 13. Thus, the support 2 can be adjusted in a vertical plane passing through the carbon axis.

Since in practice frequently carbons of only two different diameters are used, the tubes 12 and 13 may be given two predetermined positions by means of a crank 34 so that carbons of different diameter can be used by simply moving the crank 34 from one marked position to the other.

What is claimed is:

1. A device for striking carbon arcs in film projectors comprising supports for the facing ends of opposed carbon rods, said carbon rods being slidable in their axial direction in said supports, a plurality of carriages each located at the ends of the carbon rods remote from said facing ends, each carriage having a clamping device for removably holding said carbon rod, a guide rod, means connecting each of said carriages to said guide rod for movement thereon in the direction of the longitudinal axes of said carbon rods, and a profiled control member which is rotatably mounted and extends in a direction substantially parallel to the longitudinal axes of said carbon rods said control member operatively engaging said carriage thereby rotating said clamping device about said guide rod whereby the carbon rods may be adjustable.

2. A device for striking carbon arcs in film projectors comprising supports for the facing ends of opposed carbon rods, said carbon rods being slidable in their axial direction in said supports, a plurality of carriages each located at the ends of the carbon rods remote from said facing ends, each carriage having a clamping device for removably holding said carbon rod, a guide rod, means connecting each of said carriages to said guide rod for movement thereon in the direction of the longitudinal axes of said carbon rods, and a rotatably mounted control member having a camming surface engaging and rotating said carriages about said guide rod, and said clamping device having a fixed abutment for a carbon rod being so chosen that the perpendicular bisector of the line joining the centers of two carbon rods of different diameters at right angles to their axes passes substantially through the pivot point of said carriages.

3. A device for striking carbon arcs in film projectors as claimed in claim 1 further comprising a horizontal shaft for said support located perpendicular to said control member, said support being rotatable about said horizontal shaft.

4. A device for striking carbon arcs in film projectors as claimed in claim 1 further comprising a crank element secured to said control member for manually adjusting the relative positions of said carbon rods.

References Cited in the file of this patent
UNITED STATES PATENTS

| | | |
|---|---|---|
| 989,698 | Davis | Apr. 18, 1911 |
| 1,810,299 | Spahr | June 16, 1931 |